United States Patent
Cho et al.

(10) Patent No.: US 10,503,487 B2
(45) Date of Patent: Dec. 10, 2019

(54) SYSTEM AND METHOD FOR DEPLOYING AND CONTROLLING MOBILE OPERATING SYSTEM ON A PLATFORM

(71) Applicant: INDUSTRIAL TECHNOLOGY RESEARCH INSTITUTE, Hsinchu (TW)

(72) Inventors: Chuan-Yu Cho, Hsinchu (TW); Ping-Hsien Chi, Taipei (TW); Po-Wen Cheng, Tainan (TW); Wei-Te Hsu, New Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 79 days.

(21) Appl. No.: 15/854,609

(22) Filed: Dec. 26, 2017

(65) Prior Publication Data

US 2019/0163455 A1  May 30, 2019

(30) Foreign Application Priority Data

Nov. 30, 2017  (TW) .............................. 106141806 A (51) Int. Cl.
*G06F 9/44* (2018.01)
*G06F 8/61* (2018.01)

(52) U.S. Cl.
CPC ...................................... *G06F 8/61* (2013.01)

(58) Field of Classification Search
CPC ........ G06F 21/50; G06F 9/45533; G06F 9/50; G06F 9/5055
See application file for complete search history.

(56) References Cited

U.S. PATENT DOCUMENTS

| 7,895,521 B2 | 2/2011 | Bhogal et al. |
| 8,086,627 B2 * | 12/2011 | Pastorelli ............ G06F 11/3006 707/770 |

(Continued)

FOREIGN PATENT DOCUMENTS

| CN | 101754466 A | 6/2010 |
| CN | 102638475 A | 8/2012 |

(Continued)

OTHER PUBLICATIONS

Alfredo Gardel Vicente, et al., "Remote Automation Laboratory Using a Cluster of Virtual Machines", IEEE Transactions on Industrial Electronics, 2010.

(Continued)

*Primary Examiner* — Duy Khuong T Nguyen
(74) *Attorney, Agent, or Firm* — Maschoff Brennan (57) ABSTRACT

A method for deploying and controlling a mobile operating system on a platform comprises sending a first deployment message to the platform by an administration console; establishing a first communicable connection to the platform by a mobile communication device; getting at least an image file of a mobile operating system and an image file of a first mobile application from a data center, activating the mobile operating system by the platform and executing the first mobile application; executing a remounting procedure by the administration console according to another instruction sent from the mobile communication device; wherein the remounting procedure is configured to disconnect the first communicable connection and establish a second communicable connection between the mobile communication device and the platform or another platform that the mobile operating system and a second mobile application can be executed on the platform or on said another platform.

15 Claims, 4 Drawing Sheets

(56) References Cited

U.S. PATENT DOCUMENTS

| | | |
|---|---|---|
| 9,210,212 B2 | 12/2015 | Ivashin et al. |
| 9,256,393 B2 | 2/2016 | Ivashin et al. |
| 9,444,912 B1 | 9/2016 | Chen et al. |
| 9,715,400 B1 * | 7/2017 | Sethuramalingam ........................ G06F 9/45533 |
| 10,013,213 B2 * | 7/2018 | Suresh .................. G06F 3/0665 |
| 10,037,196 B2 * | 7/2018 | McPherson ............... G06F 8/36 |
| 2005/0144431 A1 | 6/2005 | Lin et al. |
| 2006/0230105 A1 | 10/2006 | Shappir et al. |
| 2010/0146504 A1 | 6/2010 | Tang |
| 2012/0030685 A1 | 2/2012 | Jackson |
| 2013/0110905 A1 | 5/2013 | Howe et al. |
| 2013/0117678 A1 | 5/2013 | Sun et al. |
| 2013/0132953 A1 * | 5/2013 | Chuang ..................... G06F 8/61 718/1 |
| 2013/0232480 A1 | 9/2013 | Winterfeldt et al. |
| 2013/0232498 A1 | 9/2013 | Mangtani et al. |
| 2014/0108722 A1 | 4/2014 | Lipchuk et al. |
| 2014/0115578 A1 * | 4/2014 | Cooper ................. G06F 21/606 718/1 |
| 2016/0056975 A1 | 2/2016 | Marin |
| 2018/0109625 A1 * | 4/2018 | Jayaraman ............ H04L 67/141 |

FOREIGN PATENT DOCUMENTS

| | | |
|---|---|---|
| CN | 101754466 B | 9/2012 |
| CN | 105763545 A | 7/2016 |
| TW | I239160 B | 9/2005 |
| TW | I459298 A | 5/2013 |
| TW | 201640371 A | 11/2016 |

OTHER PUBLICATIONS

Charles Border, "The development and deployment of a multiuser, remote access virtualization system for networking, security, and system administration classes", SIGCSE '07 Proceedings of the 38th SIGCSE technical symposium on Computer science education, Mar. 2007.

TW Office Action dated Jul. 12, 2018 in application No. 106141806.

* cited by examiner

SYSTEM AND METHOD FOR DEPLOYING AND CONTROLLING MOBILE OPERATING SYSTEM ON A PLATFORM

CROSS-REFERENCE TO RELATED APPLICATIONS

This non-provisional application claims priority under 35 U.S.C. § 119(a) on Patent Application No(s). 106141806 filed in Taiwan on Nov. 30, 2017, the entire contents of which are hereby incorporated by reference.

TECHNICAL FIELD

This disclosure relates to a system and a method for deploying and controlling a mobile operating system, particularly a method for mounting the mobile operating system on a platform and executing a mobile application.

RELATED ART

With the popularity of mobile communication devices gradually increasing in recent years, BYOD (Bring Your Own Device) has become a working fashion. BYOD refers to that employees respectively bring their personal devices to process jobs. Particularly, these personal devices are mobile communication devices such as smartphones or tablet PCs. Compared to laptops or desktop PC, the portability of smartphones and tablet PCs makes BYOD more convenient. BYOD not only improves the working efficiency, but also is convenient to be adapted for mobile office, meeting the needs of modern mobile business requirement. However, an enterprise that opening up BYOD policy for employees may increase the risk of confidential data leakage. Situations, such as losing the mobile phone, getting a mobile phone infected by a virus or implanted with a malicious application, are most likely to leak confidential information of the enterprise and can cause unrecoverable damage of goodwill or money.

MDM (Mobile Device Management) has been adopted for years. However, the management policies for overall-device protection and real-time monitoring reduce the convenience of usage. Therefore, another technology called VMI (Virtual Mobile Infrastructure) was proposed. VMI, also known as "remote mobile virtualization", is similar to its predecessor technology, VDI (Virtual Desktop Infrastructure). VDI is a technology that separates the operating system and application from a client device, then executes them on another computing device. Specifically, hosts or servers that execute company's internal applications are actually located in the cloud or data center while employees execute a thin client application that is able to show a usable virtualized mobile operating system on their mobile phones or tablets. VMI achieves the convenience as BYOD provided and keeps confidential information access in secure by running an isolated environment on the mobile phone. However, the design of the VMI architecture will directly affect the service performance.

SUMMARY

According to one or more embodiments of this disclosure, a method for deploying and controlling a mobile operating system on a platform configured for a client application running on a mobile communication device comprises: sending a first deployment message to the platform by an administration console; establishing a first communicable connection to the platform by the mobile communication device; getting at least an image file of the mobile operating system and an image file of a first mobile application from a data center; activating the mobile operating system by the platform and executing the first mobile application according to an instruction sent from the mobile communication device; and executing a remounting procedure by the administration console according to another instruction sent from the mobile communication device, wherein the remounting procedure is configured to disconnect the first communicable connection and to establish a second communicable connection between the mobile communication device and the platform or between the mobile communication device and another platform so that the mobile operating system and a second mobile application executed on the platform or on said another platform.

According to one or more embodiments of this disclosure, a system for deploying and controlling a mobile operating system on a platform comprises: a client application running on a mobile communication device, wherein the client application is configured for sending a login request and a switching request, wherein the login request is configured for getting a platform and establishing a communicable connection to the platform, the switching request is configured for switching from a mobile application to another mobile application; an administration console in communicable connection with the mobile communication device, wherein the administration console is configured for receiving the login request and allocating a platform to the mobile communication device to establish the communicable connection according to the login request, and the administration console is further configured for receiving the switching request to execute a remounting procedure according to the switching request; a platform cluster in communicable connection with the mobile communication device and the administration console, wherein the platform cluster comprises a plurality of platforms and each of the platforms is configured for executing the mobile operating system and the mobile application; and a data center in communicable connection with the platform cluster, wherein the data center is configured for storing an image file of the mobile operating system and a plurality of image files of the mobile applications; wherein the platform allocated by the administration console at least gets the image file of the mobile operating system and one of the image files of the mobile applications.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The embodiment of the present disclosure adopts the VMI (Virtual Mobile Infrastructure) architecture that a mobile communication device (such as a smartphone or a tablet) launches a virtual mobile device on a platform via a network to dynamically deploy and activate a mobile operating system for providing services and running mobile applications.

Figure 1:
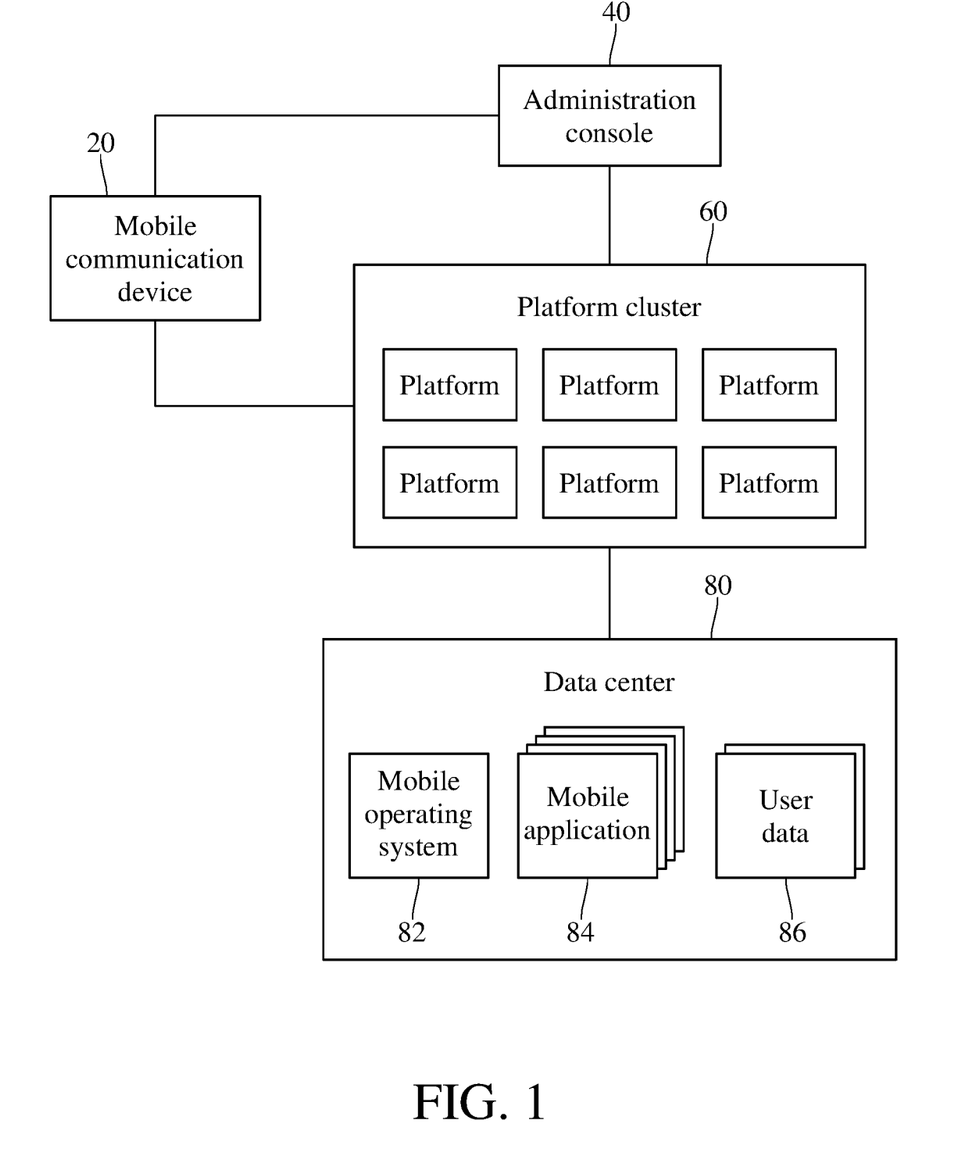
FIG. 1 is an architecture diagram of a system for deploying and controlling a mobile operating system on a platform according to an embodiment of the present disclosure.

Please refer to FIG. 1, which is a schematic view of a system architecture for deploying and controlling a mobile operating system on a platform according to an embodiment of the present disclosure. As shown in FIG. 1, the system comprises a client application (not depicted in FIG. 1) running on a mobile communication device 20, an administration console 40, a platform cluster 60, and a data center 80. The administration console 40 is in communicable connection with the mobile communication device 20 and the platform cluster 60, the platform cluster 60 is in communicable connection with the mobile communication device 20, and the data center 80 is in communicable connection with the platform cluster 60.

The client application is configured for sending a login request and a switching request by the mobile communication device 20. The login request is configured for getting a platform and for establishing a communicable connection with the platform. The switching request is configured for switching from a running mobile application to another mobile application.

The administration console 40 is configured for receiving the login request and allocating the platform to the mobile communication device 20 to establish the communicable connection according to the login request. The administration console 40 is further configured for receiving the switching request to execute a remounting procedure according to the switching request. Practically, the administration console 40 is a server or a software running on a server.

The platform cluster 60 comprises a plurality of platforms, each of the platforms is configured for executing the mobile operating system and the mobile application. In an embodiment of the present disclosure, the mobile operating system is Android. In other embodiments, the mobile operating system can be iOS or Windows Phone. The present disclosure does not limit the type of the mobile operating system. Each platform of the platform cluster 60 can be a virtual machine in a hypervisor or a container host, the related descriptions of which will be described in detail later.

In an embodiment of the present disclosure, the data center 80 is configured for storing an image file 82 of the mobile operating system and the image files 84 of a plurality of the mobile applications. The data center 80 provides the image file 82 of the mobile operating system and the specified image file 84 of the mobile application to the platform which sends a request to the data center 80. Please refer to FIG. 1, in another embodiment of the present disclosure, the data center 80 is further configured for storing a plurality of image files 86 of user data. Therefore, when a platform in the platform cluster 60 sends the request to the data center 80, in addition to the image file 82 of the mobile operating system and the image file 84 of the specified mobile application, the data center further sends out the specified image file 86 of the user data. Practically, the services required by the data center 80 such as cloud computing services or remote network services can be provided by a cloud computing software called OpenStack or a cloud computing platform called AWS (Amazon Web Services). Data center 80 may also be implemented by a plurality of NASs (Network Attached Storages) to provide services of centralized data access. The present disclosure is not limited by the examples stated above.

The data center 80 comprises a plurality of partitions, wherein the image file 82 of the mobile operating system occupies a partition, and each of the image files 84 of mobile applications respectively occupies a partition. In an embodiment of the present disclosure, each image file 84 of the mobile applications further comprises a plurality of image files 86 of the user data. The image files 86 of the user data are classified according to the user ID assigned to the client application. When the client application executes a specified mobile application, the allocated platform can only access the image file 86 of user data with a user ID matching the user ID of the client application. In another embodiment of the present disclosure, the data center 80 also comprises a plurality of partitions, the image file 82 of the mobile operating occupies a partition and each of the image files 86 of user data respectively occupies a partition, and the image file 84 of the same mobile application respectively occupies a partition according to the different users. For example, in the data center 80 with Android file system, a "system" folder occupies a partition, each user has a "data" folder corresponding to a partition, and each of the mobile application has a plurality of "SD card" folders which respectively occupies a plurality of partitions according to the number of users. For example, in a scenario of three users (U1, U2, U3) and two applications (A1, A2), in addition to a partition for the "system" folder, the data center 80 must further comprise at least six partitions for storing each of mobile applications of each user such as U1A1, U2A1, U3A1, U1A2, U2A2 and U3A3, wherein U1A1 represents that user U1 with his mobile application A1 and so on.

Figure 2:
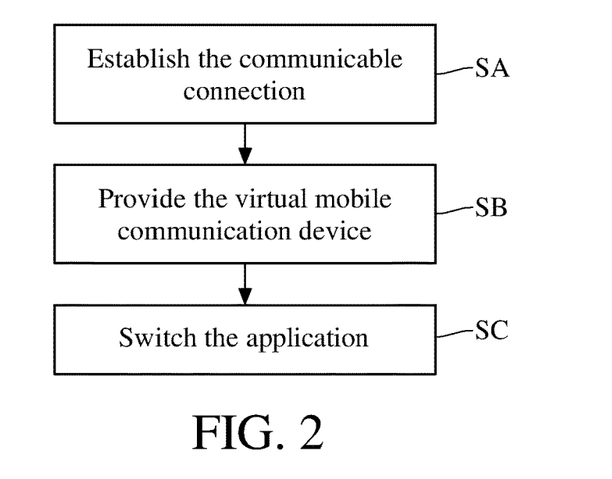
FIG. 2 is a flowchart of a method for deploying and operating a mobile operating system on a platform according to an embodiment of the present disclosure.

Please refer to FIG. 2. FIG. 2 is a flowchart of a method for deploying and controlling a mobile operating system on a platform according to an embodiment of the present disclosure. The method is divided into three main steps, steps SA, SB, and SC. Step SA is "establishing the communicable connection", step SB is "providing the virtual mobile communication device", and step SC is "switching the application". Specifically, in the step SA, the administration console 40 sends a first deployment message to the platform and the mobile communication device 20 establishes a first communicable connection with the platform. In the step SB, the platform at least gets the image file 82 of the mobile operating system and the image file 84 of the first mobile application from the data center 80, then the platform executes the mobile operating system and executes the first mobile application according to the instructions sent from the mobile communication device 20. In the main step SC, the administration console 40 executes a remounting procedure according to another instruction sent from the mobile communication device 20. The remounting procedure disconnects the first communicable connection and establishes a second communicable connection between the mobile communication device 20 and the platform or another platform so that the platform or said another platform can launch the mobile operating system and execute the second mobile application.

Figure 3:
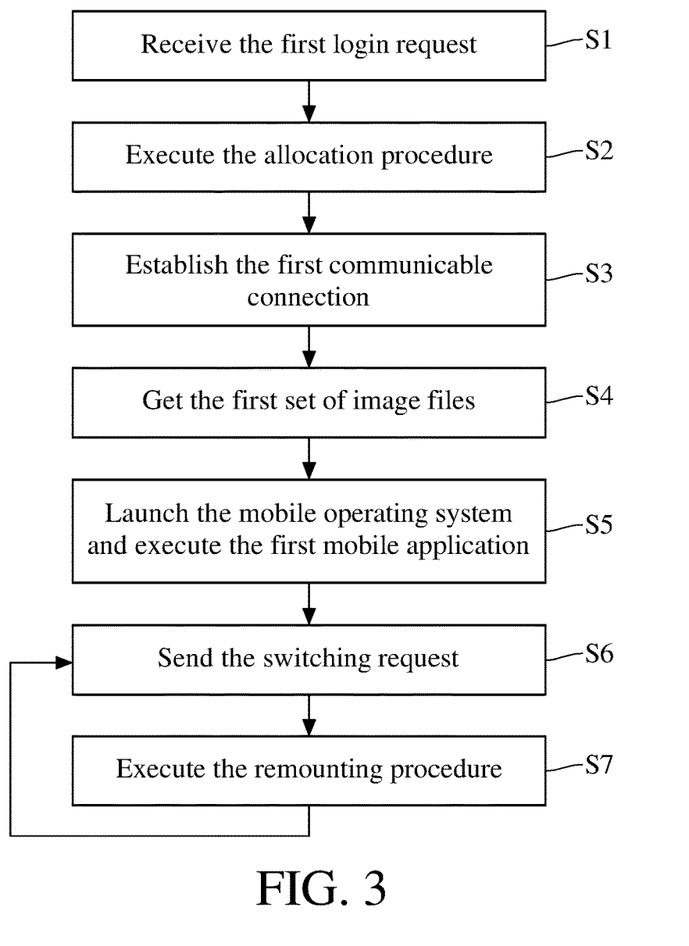
FIG. 3 is a detailed flowchart of a method for deploying and operating a mobile operating system on a platform according to an embodiment of the present disclosure.

The aforementioned step SA comprises steps S1-S3 as shown in FIG. 3. Please refer to the step S1, "receiving the first login request". Specifically, the following operations are performed in this step S1. A user executes a designated client application on the mobile communication device 20 and then performs a login operation. The client application stores a network address of the administration console 40 and the mobile communication device 20 uses the network address to send out the first login request generated by the client application in a way of wireless communication. The administration console 40 receives the first login request. In practice, only an authorized user can send out the first login request, so the user needs to enter a password corresponding to his account for login. The account and the password are obtained by, for example, performing a registration process in the client application. It should be noticed that other secure login methods such as fingerprint recognition can also be adopted in the present disclosure. In another embodiment of the present disclosure, after the administration console 40 receives the first login request, the administration console 40 connects to a NIS (Network Information Service) host to authenticate the user ID of the mobile device 20.

In an embodiment of the present disclosure, a login policy and a topology setting can be further configured before the step S1. For example, a system administrator configured the information related to the login policy (such as the processing procedure after receiving the login request) and the topology (such as the internal connection type of the platform cluster 60) in a management interface (inputs the information related to the login policy and the topology via a management interface) for said information to be stored in the administration console 40.

Please refer to the step S2, "executing the allocation procedure" in FIG. 3. The allocation procedure allocates a platform of the platform cluster 60 for providing a service to a user who issued the login request in the step S1. In an embodiment of the present disclosure, each platform of the platform cluster 60 is a virtual machine invoked in an operating system running on a physical host. In another embodiment of the present disclosure, each platform of the platform cluster 60 is a container invoked in an operating system running on a physical host. The physical host can maintain a plurality of containers, and the maximum number of available containers depends on the physical host's hardware performance. These containers share the same kernel of an operating system of the physical host.

Figure 4:
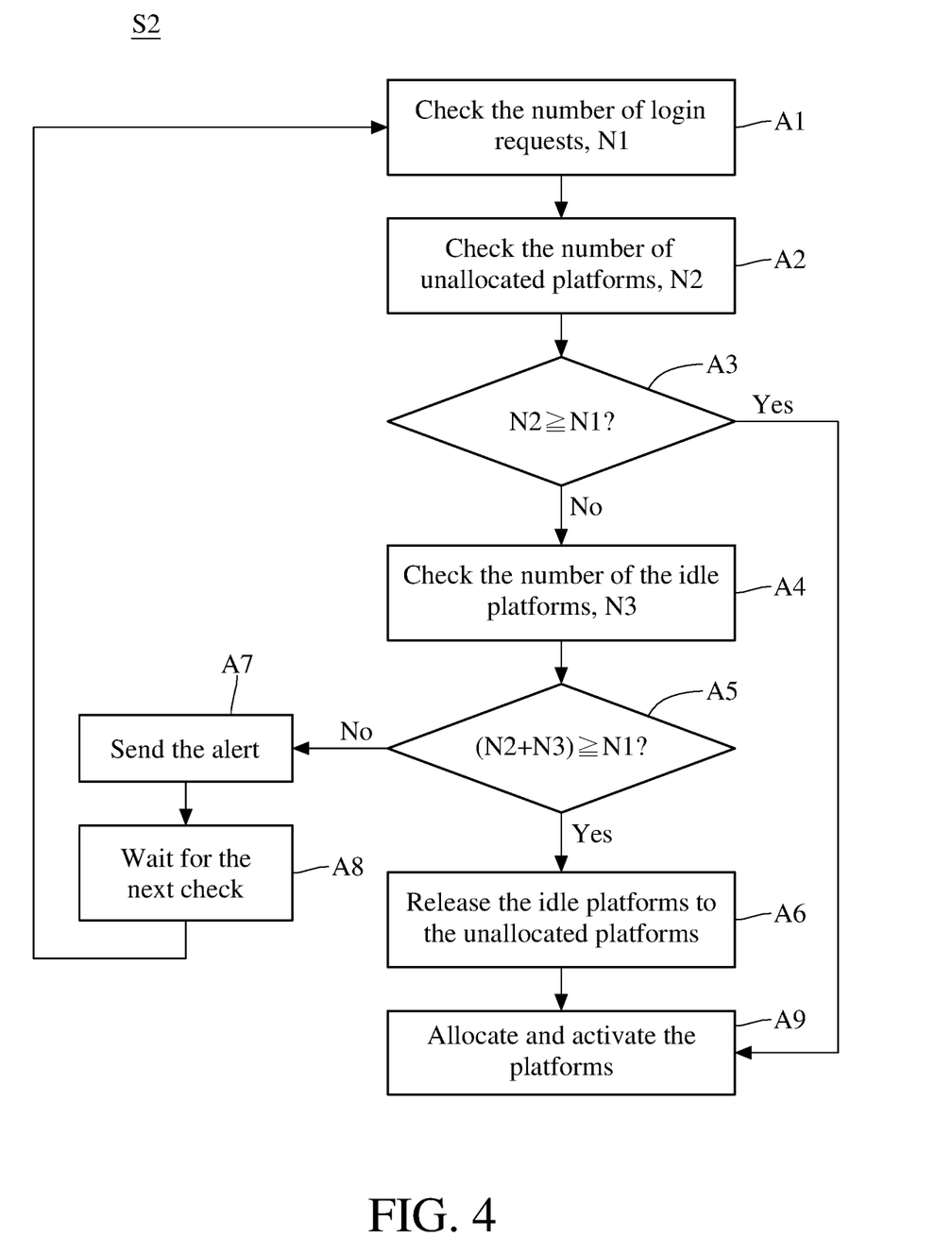
FIG. 4 is a flowchart of the allocation procedure according to an embodiment of the present disclosure.

Please refer to FIG. 4, which is a flowchart of the allocation procedure according to an embodiment of the present disclosure. Specifically, the step S2 comprises the following steps A1-A9. Please refer to the step A1, "checking the number of login requests, N1" and the step A2 "checking the number of unallocated platforms, N2". The number of login requests means the total number of login requests received by the administration console 40 from mobile communication devices 20 at a certain time. Said unallocated platforms represent platforms that have no communicable connection with any mobile communication device 20. The administration console 40 repeatedly performs the steps A1 and A2 and the performing frequency depends on a default schedule. In another embodiment of the present disclosure, the administration console 40 reads the aforementioned policy to obtain the schedule information before the step A1.

Please refer to the step A3 and step A9 in FIG. 4. If a determination result of the step A3 is N2≥N1, which means that the number of unallocated platforms is greater than or equal to the number of login requests, the administration console 40 allocates N1 platforms to N1 mobile communication devices 20 and activates these assigned platforms in the step A9. For example, if the platform is the virtual machine, the "activating" operation in the step A9 may include the following operations: after powering on the physical host, activating a network interface control chip through the BIOS code or the expansion memory of the network interface card on the motherboard of the platform. If the platform is the container, the "activating" operation may skip the hardware booting steps and executes the software initialization program or the container's configuration setting only. The "allocating" operation in the step A9 is, for example, informing the mobile communicable device 20 about the network address of the allocated platform or redirecting the communicable connection between the mobile communication device 20 and the administration console 40 to the allocated platform and the mobile communication device 20.

Please refer to the steps A3-A5 in FIG. 4. If a determination result of the step A3 is N2<N1, which means that the number of unallocated platforms is less than the number of login requests, that is, the number of allocable platforms is not enough to serve all mobile communication devices 20 which issued the login request, the allocation procedure further performs the step A4, "checking the number of the idle platforms, N3". After the step A4, the number of unallocated platforms and the number of idle platforms are summed to compare with the number of login requests as shown in step A5. If (N2+N3)≥N1, i.e., the summed value is greater than or equal to the number of login requests, the step A6, "releasing the idle platform to the unallocated platform", is performed by the administration console 40, and then the step A9 is executed in the allocation procedure for the administration console 40 to allocate and activate platforms. It should be noted that the "unallocated platform" refers to a platform that has not been activated yet (yet to be allocated), and the "idle platform" refers to an activated platform that has been allocated to a mobile device 20 while the mobile device 20 has not operated on the platform for a period of time. Through the strategy for finding and releasing idle platforms in steps A4-A6, the allocation procedure described in an embodiment of the present disclosure can increase the utilization rate of the platform cluster 60 and allocate a limited number of platforms to the mobile communication device 20 which issues the login request as much as possible.

Please return to the step A5 in FIG. 4. If (N2+N3)<N1, i.e., the sum of the numbers of unallocated platforms and idle platforms is still less than the number of login requests, it represents that the login requests exceed the system's load capability. In this case, the allocation procedure performs the step A7, "sending the alert out" by the administration console 40 to notify the system administrator, thus the system administrator may take some necessary actions. For example, the system administrator may adjust the period of the idle time which is used to determine whether the platform is idle or not so that more idle platforms can be released. Please refer to step A8, "waiting for the next check" according to the default schedule. The administration console 40 determines the interval time from step A8 to step A1 according to the check frequency defined in the schedule and then checks whether the number of login requests reduces or the number of unallocated platforms increases in the step A2. In short, the administration console 40 executes the allocation procedure according to the schedule, so as to allocate the available platforms in the platform cluster 60 to one or more mobile communication devices 20 that send the login requests.

In an embodiment of the present disclosure, the allocated platform is a virtual machine. After the allocation procedure is done, the administration console 40 adopts TFTP (Trivial File Transfer Protocol) to load a boot image into the main memory of the physical host of the allocated platform. Said boot image is configured to provide the necessary bootloader after the physical host is powered on. In addition, the administration console 40 adopts DHCP (Dynamic Host Configuration Protocol) to obtain a network address of the physical host to which the allocated platform belongs and the administration console 40 then sends the network address to the mobile communication device 20.

Please refer to step S3, "establishing the first communicable connection" in FIG. 3. The "first communicable connection" refers to a wireless communicable connection between the mobile communication device 20 and the platform allocated thereto. For example, the mobile communication device 20 redirects its connection destination from the administration console 40 to the allocated platform. In an initial stage of establishing the first communicable connection, the administration console 40 sends a first deployment message to the platform. The first deployment message comprises a plurality of deployment parameters about the mobile operating system and these deployment parameters such as the number of virtual processors (vCPUs), memory size and network settings are used to configure parameters of the virtual machine running on the platform. It should be specially emphasized that each time the mobile communication device 20 establishes the communicable connection with the platform, the parameters in the deployment message can be modified according to the input of the client application or the default deployment parameters saved in the administration console 40. In other words, the parameters for each deployment can be totally identical or different. Additionally, when the first communicable connection is established, a daemon process running in the virtual machine on the platform receives the first communicable connection. Once the first communicable connection is established, a video stream signal of the platform can be transmitted to the mobile communication device 20 through, for example, a WebRTC (Web Real Time Communication) protocol. In other words, the client application receives video stream signals via the communicable connection and displays the video streaming signal on the screen of the mobile communication device 20 accordingly.

Please refer to in FIG. 2. Regarding the foregoing step SB, "providing the virtual mobile communication device", it comprises the steps S4-S5 as shown in FIG. 3. Please refer to the step S4, "getting the first set of image files", and the step S5, "launching the mobile operating system and executing the first mobile application". The platform gets the first set of image files from the data center 80. Practically, the platform uses iSCSI (Internet Small Computer System Interface) or NFS (Network File System) protocol to acquire the first set of image files. The first set of image files comprises a plurality of image files.

In the embodiment that adopts a container as the platform, one of the first set of image files is the image file 82 of the mobile operating system while another one of the first set of image files is the image file 84 of the mobile application, and the image file 84 of the first mobile application comprises a plurality of the image files 86 of user data. After mounting (by iSCSI for example) and launching the mobile operating system, the platform can access a home directory of the first mobile application according to the application ID of the first mobile application and the user ID of the client application, by using a relative path as follows:
    data/data/app_package_name/user_id.
Therefore, on the mobile communication device 20, the user can control the mobile operating system and the first mobile application running on the platform by sending out instructions through the first communication connection.

In the embodiment that adopts a virtual machine running on a physical host as the platform, the platform needs to get the following image files: the image file 82 of the mobile operating system, the image file 84 of the first mobile application, and the image file 86 of certain user data. The differences between this embodiment and the previous embodiment are that the image file 86 of certain user data is mounted independently and the platform additionally gets the image file 86 of certain user data from the data center 80, while the image file 86 of the user data is incorporated with the image file 84 of mobile application in the previous embodiment. In other words, the image file 84 of the mobile application and the image file 86 of the user data are integrated as a single image file, so the platform does not need to get the image file 86 of the user data additionally. Consequently, this embodiment achieves the effect of confidential information isolation by mounting different image files of different user data, while the previous embodiment achieves the same effect through the access path with the suffix of user ID. By the way, the previous embodiment has a faster speed of deployment because the platform only needs to mount one image file 84 of the mobile application.

Please refer to FIG. 2. Regarding the foregoing step SC, "switching the application", it comprises steps S6-S7 as shown in FIG. 3. Please refer to the step S6, "sending the switching request" and step S7, "executing the remounting procedure". In a practical application scenario of the mobile operating system, the user inevitably needs to switch the first mobile application currently executed to a second mobile application. When the user performs the switch operation, the client application sends a switching request by the mobile communication device 20 as shown in the step S6. This switching request is then received by the platform through the first communicable connection, and the platform executes the remounting procedure accordingly as shown in the step S7. After executing the remounting procedure, the client application mounts the second mobile application. If the user needs to switch applications again, the steps S6-S7 are performed again to switch to the next specified mobile application.

Figure 5:
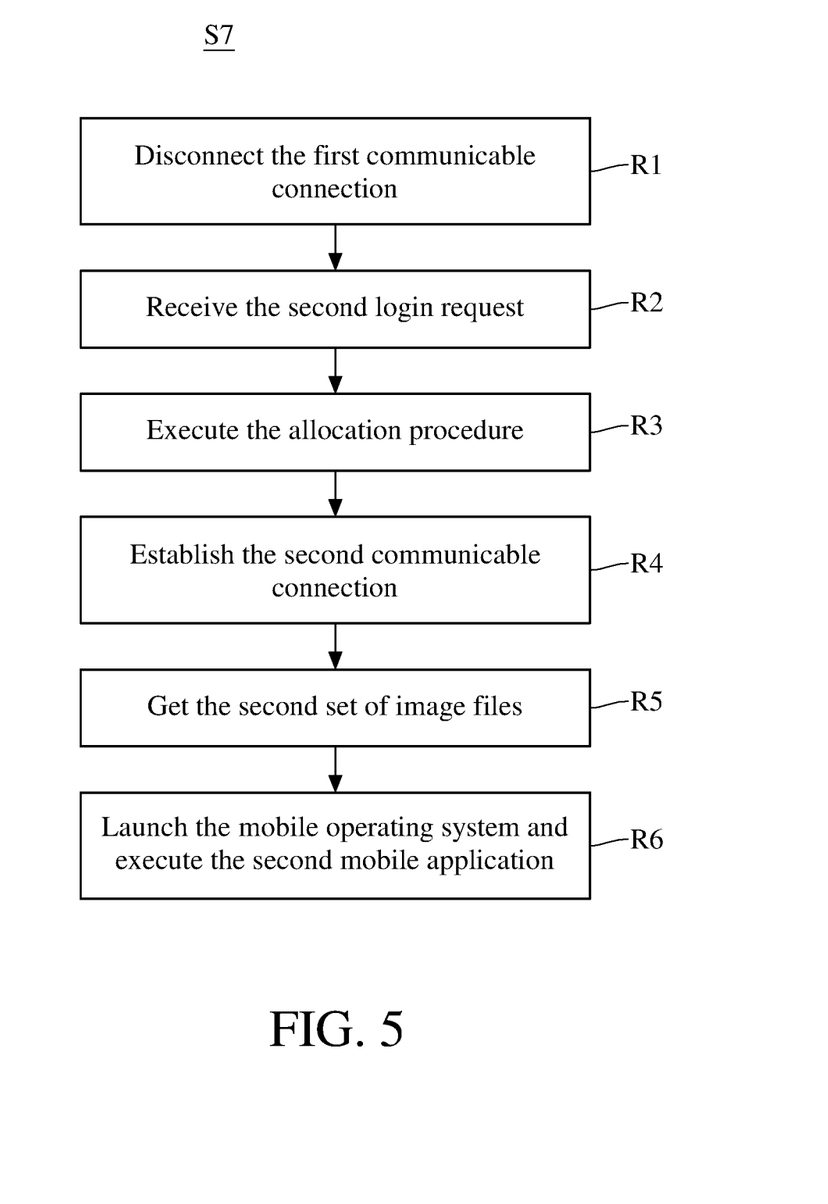
FIG. 5 is a flowchart of the remounting procedure according to an embodiment of the present disclosure.

Please refer to FIG. 5, which is a flowchart of remounting procedure according to an embodiment of the present disclosure. Specifically, the step S7 in FIG. 3 comprises the steps R1-R6 shown in FIG. 5 and described below. Please refer to the step R1, "disconnecting the first communicable connection". Because any operation in the first mobile application is implemented by sending instructions through the first communicable connection, the client application needs to disconnect the first communicable connection before switching to the second mobile application. In other words, the communicable connection is bonding to a certain mobile application. As a result, when a malicious program or a virus intrudes into the first mobile application or the mobile operating system, they cannot affect other partitions occupied by mobile applications other than the first mobile application in the data center 80 through the first communicable connection which is probably infected. Therefore, the harm of the malicious program or the virus can be limited in the scope of the mobile applications currently executed.

Please refer to the step R2, "receiving the second login request" by the administration console 40. After the first communicable connection is disconnected, the client application continues to send the second login request to the administration console 40 by the mobile communication device 20 to obtain the platform.

Please refer to step R3, "executing the allocation procedure" by the administration console 40. After receiving the second login request, the administration console 40 executes the allocation procedure that has been introduced in the step S2 to obtain a platform. It should be noted that, in an embodiment of the present disclosure, the newly allocated platform for the second mobile application and the previously allocated platform for the first mobile application can be one of the following: different containers on the same host, different containers on different hosts, or the same container on the same host. In another embodiment of the present disclosure, the platform for the second mobile application and the platform for the first mobile application can be different virtual machines on different physical hosts. In addition, in said another embodiment of the present disclosure, after receiving the second login request, the administration console 40 connects to a NIS (Network Information Service) host to verify the user ID of the mobile communication device 20.

Please refer to step R4, "establishing the second communicable connection" by the administration console 40. Specifically, after the platform being allocated for the second login request, the administration console 40 sends the second deployment message to this platform. The purpose and the composition of the second deployment message and the first deployment message are similar. The second deployment message also comprises a plurality of deployment parameters of the mobile operating system which is used to configure the virtual machine running on the platform. The deployment parameters of the first deployment message can be completely identical to or different from the deployment parameters of the second deployment message. It should be noticed that the conventional VDI (Virtual Desktop Infrastructure) adopts a configuration file called "blueprint" for deploying the virtual machine to implement the remounting procedure. However, the "blueprint-based" deploying method tends to deploy only once when the communicable connection is established for the first time. After the user disconnects the communicable connection and then establishes the communicable connection again, the deployment parameters specified in the blueprint are still the same. Namely, the conventional VDI leads to completely identical configurations every time the virtual machine deployed, and is difficult to update the deployment parameters according to user's requirement. In the present disclosure, switching the mobile application each time leads to the remounting procedure be executed each time, so the image file 82 of the mobile operating system and the newly selected image file 84 of the mobile application are remounted. Therefore, the configuration parameters of the virtual machine can be updated by adjusting the deployment parameters in the first deployment message or in the second deployment message so that the platform deployment can be more flexible.

Please refer to the step R5, "getting the second set of image files" by the platform. The platform allocated for executing the second mobile application gets the second set of image files from the data center 80. In an embodiment, the second set of image files comprises the image file 82 of the mobile operating system and the image 84 of the second mobile application, wherein the image file 84 of the second mobile application comprises the image file 86 of the user data; namely, the platform does not need to get the image file 86 of the user data additionally in the embodiment. Alternatively, in another embodiment, the second set of image files comprises the image file 82 of the mobile operating system, the image file 84 of the second mobile application, and the image file 86 of the user data; that is, the platform needs to get the image file 86 of the user data additionally.

Please refer to the step R6, "launching the mobile operating system and executing the second mobile application". After getting the image file 82 of the mobile operating system and the image file 84 of the second mobile application, the platform can mount these two image files to provide services to the user who uses the client application. To summarize the remounting procedure, the steps R2-R6 in FIG. 5 are equivalent to steps S1-S5 described in FIG. 3, and these steps are about platform allocation, mobile operating system/mobile application mounting. When the user needs to execute a certain mobile application, the client application establishes a communicable connection to the platform to mount the mobile application. When the user disconnects the communicable connection from the platform, the mobile operating system and the mobile application running currently on the platform become idle, the platform can be released as an unallocated platform according to the step A6 in FIG. 4. When the user continues to execute the mobile application interrupted previously, the user can continue to work on a different platform (or the same platform) with the previously updated environment because of the mounting procedure of the present disclosure, and the user can switch the mobile applications at any time so that enhancing the efficiency of BYOD while keeping the confidential information without leakage.

To sum up, according to the method and the system for deploying and controlling a mobile operating system on a platform in the embodiments of the present closure, a client application on a mobile communication device can mount a virtual mobile communication device on a platform within a data center. A user who operates the client application feels that the mobile application is running on the mobile communication device instead of a remote machine. As a BYOD solution, the mobile communication device does not need to afford what is necessary for executing a virtual machine or an additional device management program. The design of remounting procedure ensures that no additional conflicts between mobile applications and thus decreasing the impact of malicious programs or virus.

What is claimed is:

1. A method for deploying and controlling a mobile operating system on a platform configured for a client application running on a mobile communication device comprises:
    receiving a first login request from the mobile communication device by an administration console:
    executing an allocation procedure to allocate the platform according to the first login request by the administration console; wherein the allocation procedure comprises:
        checking a number of login requests by the administration console;
        checking a number of unallocated platforms in a platform cluster by the administration console, wherein the platform cluster comprises a plurality of platforms:

allocating at least one platform from the platform cluster according to the number of login requests by the administration console when the number of login requests is smaller than or equal to the number of unallocated platforms;

checking a number of idle platforms by the administration console when the number of login requests is greater than the number of unallocated platforms;

sending an alert by the administration console when the number of login requests is greater than a sum of the number of idle platforms and the number of unallocated platforms; and releasing at least one platform from the idle platforms by the administration console when the number of login requests is smaller than or eaual to the sum of the number of idle platforms and the number of unallocated platforms:

sending a first deployment message to the platform by the administration console;

establishing a first communicable connection to the platform by the mobile communication device;

getting at least an image file of the mobile operating system and an image file of a first mobile application from a data center;

activating the mobile operating system by the platform and executing the first mobile application according to an instruction sent from the mobile communication device; and executing a remounting procedure by the administration console according to another instruction sent from the mobile communication device, with said another instruction being configured for switching from a mobile application to another mobile application, wherein the remounting procedure is configured to disconnect the first communicable connection and to establish a second communicable connection between the mobile communication device and the platform or between the mobile communication device and another platform so that the mobile operating system and a second mobile application executed on the platform or on said another platform.

2. The method for deploying and controlling the mobile operating system on the platform according to claim 1, wherein the remounting procedure comprises receiving a second login request from the mobile communication device by the administration console after disconnecting the first communicable connection;

executing the allocation procedure to allocate the platform or said another platform configured for executing the second mobile application by the administration console according the second login request;

sending a second deployment message to the platform or said another platform configured for executing the second mobile application by the administration console;

establishing the second communicable connection between the platform or said another platform by the mobile communication device after the administration console sends the second deployment message;

getting at least the image file of the mobile operating system and an image file of the second mobile application from the data center by the platform or said another platform configured for executing the second mobile application; and activating the mobile operating system and executing the second mobile application according to the image file of the mobile operating system and the image file of the second mobile application by the platform or said another platform configured for executing the second mobile application.

3. The method for deploying and controlling the mobile operating system on the platform according to claim 2, further comprising getting an image file of a user data by the platform when the platform gets at least the image file of the mobile operating system and the image file of the second mobile application from the data center.

4. The method for deploying and controlling the mobile operating system on the platform according to claim 2, wherein each of the first deployment message and the second deployment message comprises a plurality of deployment parameters of the mobile operating system, and the plurality of deployment parameters of the first deployment message and the plurality of deployment parameters of the second deployment message are identical or different.

5. The method for deploying and controlling the mobile operating system on the platform according to claim 2, further comprising connecting to a NIS server to verify an identifier of the mobile communication device by the administration console after the administration console receives the first login request or the second login request.

6. The method for deploying and controlling the mobile operating system on the platform according to claim 1, further comprising getting an image file of a user data by the platform when the platform gets at least the image file of the mobile operating system and the image file of the first mobile application from the data center.

7. The method for deploying and controlling the mobile operating system on the platform according to claim 6, further comprising configuring a login policy by the administration console before receiving the first login request from the mobile communication device.

8. The method for deploying and controlling the mobile operating system on the platform according to claim 1, further comprising getting a network address of the platform or said another platform and sending the network address to the mobile communication device through DHCP by the administration console before establishing the first communicable connection and the second communicable connection.

9. The method for deploying and controlling the mobile operating system on the platform according to claim 1, further comprising getting an image file for booting a host computer through TFTP by the administration console after executing the allocation procedure.

10. The method for deploying and controlling the mobile operating system on the platform according to claim 1, further comprising getting at least the image file of the mobile operating system, the image file of the first mobile application and the image file of the second mobile application through iSCSI by the platform.

11. The method for deploying and controlling the mobile operating system on the platform according to claim 1, wherein the platform or said another platform is a container host or a virtual machine running in a hypervisor.

12. A system for deploying and controlling a mobile operating system on a platform comprises:

a client application running on a mobile communication device, wherein the client application is configured for sending a login request and a switching request, wherein the login request is configured for getting a platform and establishing a first communicable connection to the platform, the switching request is configured for switching from a mobile application to another mobile application;

an administration console in communicable connection with the mobile communication device, wherein the administration console is configured for receiving the login request and allocating a platform to the mobile communication device to establish the first communicable connection according to the login request, and the administration console is further configured for receiving the switching request to execute a remounting procedure according to the switching request;

a platform cluster in communicable connection with the mobile communication device and the administration console, wherein the platform cluster comprises a plurality of platforms and each of the platforms is configured for executing the mobile operating system and the mobile application; and a data center in communicable connection with the platform cluster, wherein the data center is configured for storing an image file of the mobile operating system and a plurality of image files of the mobile applications;

wherein the administration console is configured to perform an allocation procedure to allocate the platform according to the login request, and the allocation procedure comprises:

checking a number of login requests by the administration console;

checking a number of unallocated platforms in a platform cluster by the administration console, wherein the platform cluster comprises a plurality of platforms;

allocating at least one platform from the platform cluster according to the number of login requests by the administration console when the number of login requests is smaller than or equal to the number of unallocated platforms;

checking a number of idle platforms by the administration console when the number of login requests is greater than the number of unallocated platforms;

sending an alert by the administration console when the number of login requests is greater than a sum of the number of idle platforms and the number of unallocated platforms; and releasing at least one platform from the idle platforms by the administration console when the number of login requests is smaller than or equal to the sum of the number of idle platforms and the number of unallocated platforms; and the platform allocated by the administration console at least gets the image file of the mobile operating system and one of the image files of the mobile applications;

wherein the remounting procedure is configured to disconnect the first communicable connection and to establish a second communicable connection between the mobile communication device and the platform or between the mobile communication device and another platform so that the mobile operating system and a second mobile application executed on the platform or on said another platform.

13. The system for deploying and controlling the mobile operating system on the platform according to claim 12, wherein the data center is further configured for storing a plurality of image files corresponding to a plurality of user data and sending one of the plurality of image files of user data to the allocated platform.

14. The system for deploying and controlling the mobile operating system on the platform according to claim 12, wherein the client application is further configured for receiving a video stream signal through the communicable connection and showing the video stream signal on a screen of the mobile communication device.

15. The system for deploying and controlling the mobile operating system on the platform according to claim 12, wherein the mobile operating system is Android, iOS or Windows Phone.

* * * * *